(12) United States Patent
Sugiyama et al.

(10) Patent No.: US 11,433,644 B2
(45) Date of Patent: Sep. 6, 2022

(54) DECORATIVE SHEET, METHOD OF MANUFACTURING THE SAME, AND DISPLAY DEVICE

(71) Applicant: Panasonic Intellectual Property Management Co., Ltd., Osaka (JP)

(72) Inventors: Tomonori Sugiyama, Osaka (JP); Kazuhiko Kaneuchi, Osaka (JP); Hideaki Nakagawa, Osaka (JP); Takayuki Nagahara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 287 days.

(21) Appl. No.: 16/796,776

(22) Filed: Feb. 20, 2020

(65) Prior Publication Data
US 2020/0282702 A1 Sep. 10, 2020

(30) Foreign Application Priority Data

Mar. 6, 2019 (JP) .............................. JP2019-040521

(51) Int. Cl.
*B32B 27/36* (2006.01)
*B32B 7/12* (2006.01)
(Continued)

(52) U.S. Cl.
CPC ................. *B32B 7/12* (2013.01); *B32B 3/26* (2013.01); *B32B 5/022* (2013.01); *B32B 9/002* (2013.01);
(Continued)

(58) Field of Classification Search
CPC ..... B32B 21/08; B32B 21/10; B32B 2255/28; B32B 2307/538; B32B 2307/732;
(Continued)

(56) References Cited

U.S. PATENT DOCUMENTS 7,504,159 B1  3/2009 Suare et al.
2002/0031620 A1  3/2002 Yuzawa et al.
(Continued)

FOREIGN PATENT DOCUMENTS

JP  2001-341106  12/2001
JP  2016-068475  5/2016
(Continued)

OTHER PUBLICATIONS

Partial European Search Report dated Jul. 7, 2020 in related European Patent Application No. 20159297.9.

*Primary Examiner* — Lawrence D Ferguson
(74) *Attorney, Agent, or Firm* — Wenderoth, Lind & Ponack, L.L.P.

(57) ABSTRACT

A decorative sheet including: a material sheet of which a surface roughness R1 on a front side is greater than a surface roughness R2 on a back side; a first adhesive layer provided on the front side of the material sheet; a thin film layer provided above the front side of the material sheet via the first adhesive layer; a second adhesive layer provided on the back side of the material sheet; and a sheet support layer provided below the back side of the material sheet via the second adhesive layer, in which each of the layers is integrated as one sheet, and an air layer exists on an interface between the first adhesive layer and a trough of an uneven shape on the front side of the material sheet.

8 Claims, 9 Drawing Sheets

(51) Int. Cl.
*F21V 3/06* (2018.01)
*F21V 3/10* (2018.01)
*B32B 3/26* (2006.01)
*B32B 5/02* (2006.01)
*B32B 9/00* (2006.01)
*B32B 9/04* (2006.01)
*B32B 27/30* (2006.01)
*B32B 37/06* (2006.01)
*B32B 37/10* (2006.01)
*B32B 37/12* (2006.01)
*B32B 37/18* (2006.01)
*B32B 38/00* (2006.01)
*B44F 1/06* (2006.01)
*F21V 23/04* (2006.01)
*G09F 13/04* (2006.01)
*F21Y 115/10* (2016.01)
*F21W 121/00* (2006.01)

(52) U.S. Cl.
CPC .............. *B32B 9/045* (2013.01); *B32B 9/047* (2013.01); *B32B 27/308* (2013.01); *B32B 27/36* (2013.01); *B32B 27/365* (2013.01); *B32B 37/06* (2013.01); *B32B 37/10* (2013.01); *B32B 37/1207* (2013.01); *B32B 37/182* (2013.01); *B32B 38/145* (2013.01); *B44F 1/066* (2013.01); *F21V 3/0625* (2018.02); *F21V 3/10* (2018.02); *F21V 23/0485* (2013.01); *G09F 13/04* (2013.01); *B32B 2255/28* (2013.01); *B32B 2318/04* (2013.01); *B32B 2333/04* (2013.01); *B32B 2367/00* (2013.01); *B32B 2369/00* (2013.01); *B32B 2451/00* (2013.01); *B32B 2457/208* (2013.01); *F21W 2121/00* (2013.01); *F21Y 2115/10* (2016.08)

(58) Field of Classification Search
CPC ............ B32B 2307/75; B32B 2318/04; B32B 2333/04; B32B 2367/00; B32B 2369/00; B32B 2451/00; B32B 2457/208; B32B 27/08; B32B 27/12; B32B 27/308; B32B 27/36; B32B 27/365; B32B 37/06; B32B 37/10; B32B 37/1207; B32B 37/182; B32B 38/145; B32B 3/08; B32B 3/26; B32B 3/30; B32B 5/022; B32B 5/26; B32B 7/12; B32B 9/002; B32B 9/02; B32B 9/025; B32B 9/045; B32B 9/047; B44C 5/043; B44C 5/0438; B44F 1/06; B44F 1/066; F21V 23/0485; F21V 3/0625; F21V 3/10; F21W 2121/00; F21Y 2115/10; G09F 13/04
See application file for complete search history.

(56) References Cited

U.S. PATENT DOCUMENTS

| | | |
|---|---|---|
| 2017/0217123 A1 | 8/2017 | Kataoka et al. |
| 2018/0029289 A1 | 2/2018 | Hase et al. |
| 2018/0043653 A1 | 2/2018 | Sutou et al. |

FOREIGN PATENT DOCUMENTS

| | | |
|---|---|---|
| WO | 2016/136638 | 9/2016 |
| WO | 2016/159119 | 10/2016 |

DECORATIVE SHEET, METHOD OF MANUFACTURING THE SAME, AND DISPLAY DEVICE

BACKGROUND

1. Technical Field

The disclosure relates to a decorative sheet combining a thin film and a stone sheet as a material sheet, a method of manufacturing the same, and a display device using the decorative sheet.

2. Description of the Related Art

In recent years, in a surface decoration method for components, panels, or the like in fields of home appliance exteriors and in-vehicle interiors, as a customer-oriented is diversified and a genuine article-oriented and a high-grade-oriented are increased, needs for a wide range of design expressions and high-grade designs are increased. In the needs, there are increasing needs to use materials such as stone and cork as decorative materials in addition to conventionally popular materials such as natural wood and genuine leather. These decorative materials are used for expressing high-grade design, which is excellent in design, by providing a user with a texture derived from the materials such as an appearance and a sense of touch. The decorative materials described herein refer to a sheet-shaped material having a thickness equal to or less than 5 mm. Generally, a protective layer is formed on a material surface in order to ensure reliability of a product when the decorative materials are applied to home appliance exterior, in-vehicle interior, and the like.

Japanese Patent Unexamined Publication No. 2001-341106 discloses a woody decorative molded article in which a top coating film layer is formed on a veneer. This configuration is shown in FIG. 5.

Woody decorative molded article 100 of FIG. 5 is formed of top coating film layer 101, veneer 102, and base material 103. Veneer 102, which is a material sheet, has some degree of transparency due to a sheet thickness formed as thin as about 2 mm, and transparent base material 103 is integrally bonded to a back surface of veneer 102 by injection molding.

SUMMARY

A decorative sheet according to the disclosure includes:

a material sheet including a front side and a back side opposite to the front side, the front side having a first surface roughness greater than a second surface roughness of the back side;

a first adhesive layer provided on the front side of the material sheet;

a thin film layer provided above the front side of the material sheet via the first adhesive layer;

a second adhesive layer provided on the back side of the material sheet; and a sheet support layer provided below the back side of the material sheet via the second adhesive layer, in which the thin film layer has a multilayer structure including at least one or more hard coat layers and one or more ultraviolet (UV) cut-off layers, and the material sheet, the first adhesive layer, the thin film layer, the second adhesive layer, and the sheet support layer are integrated as one sheet, and an air layer exists on an interface between the first adhesive layer and a trough of an uneven shape on the surface of the material sheet.

A method of manufacturing a decorative sheet according to the disclosure includes:

a step of disposing a first adhesive layer and a thin film layer on a front side of a material sheet of which a surface roughness R1 on the front side is greater than a surface roughness R2 on a back side in order and disposing a second adhesive layer and a sheet support layer on the back side of the material sheet in order;

a step of sandwiching the thin film layer on the front side of the material sheet and the sheet support layer on the back side of the material sheet from a normal direction and applying heat with pressure; and a step of removing heat and pressure applied to the thin film layer, the first adhesive layer, the material sheet, the second adhesive layer, and the sheet support layer.

DETAILED DESCRIPTIONS

Figure 1A:
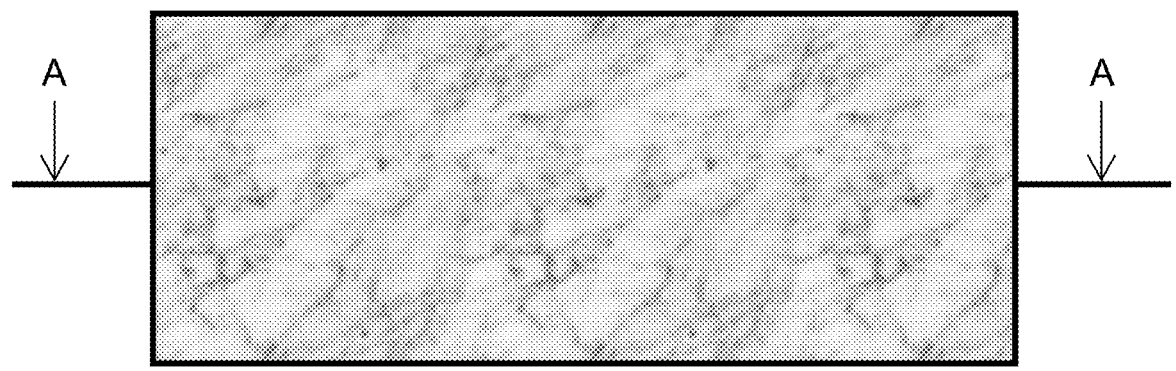
FIG. 1A is a plan view of a decorative sheet according to Exemplary embodiment 1.

In the related example, thick top coating film layer 101 is formed on a surface of veneer 102 used as a decorative material sheet by being coated with a top coat. Therefore, since there is a sense of gloss and a sense of depth in the appearance of veneer 102, a sense of incompatibility occurs when compared to the materials itself. In addition, the uneven shape on the surface of veneer 102 is covered by top coating film layer 101. Therefore, it is difficult to maintain original texture of veneer 102 such as the above described appearance and sense of touch.

In addition, since a surface protective layer is formed by coating, the uneven shape on the material surface is completely covered. That is, the surface protective layer is formed in close contact with the uneven shape of the material surface without providing a gap between the material surface and the surface protective layer. Therefore, in a case where repeated expansion and contraction due to a difference in thermal expansion of the material generated from repetition of ambient temperature change is generated, defects such as cracks may be generated in the top coating film layer and the decorative material with aging. Particularly, in an environment with drastic temperature change such as in-vehicle interior, the difference in thermal expansion has a significant effect.

An object of the disclosure is to solve the two related problems and provide a decorative sheet that can maintain texture derived from the material and reduce the defects due to changes with aging such as cracks in the decorative material and the surface protective layer due to the difference in thermal expansion between different materials.

A decorative sheet according to a first aspect includes:

a material sheet in which a relationship of Inequation R1>R2 representing that a surface roughness R1 on a front side is greater than a surface roughness R2 on a back side is satisfied;

a first adhesive layer provided on the front side of the material sheet;

a thin film layer provided above the front side of the material sheet via the first adhesive layer and having a multilayer structure including at least one or more hard coat layers and one or more UV cut-off layers;

a second adhesive layer provided on the back side of the material sheet; and a sheet support layer provided below the back side of the material sheet via the second adhesive layer, in which each of the layers is integrated as one sheet, and an air layer exists on an interface between the first adhesive layer and a trough of an uneven shape on the front side of the material sheet.

According to the above configuration, since the thin film layer has the multilayer structure including at least one or more hard coat layers and one or more UV cut-off layers, the thin film layer can be kept thin and have sufficient strength. Therefore, the material sheet can be protected by the thin film layer provided on the front side of the material sheet, and the texture derived from the material can be maintained. In addition, the air layer existing on the interface between the first adhesive layer and the trough of the uneven shape on the front side of the material sheet can absorb a volume difference due to the difference in thermal expansion between the material sheet and the thin film layer with respect to the temperature change of the decorative sheet. As a result, generation of defects due to changes with aging can be suppressed.

According to the decorative sheet of a second aspect, in the first aspect, in a case where a surface roughness on a surface of the thin film layer opposite to the first adhesive layer is denoted by RA, a surface roughness on the front side of the material sheet is denoted by RB, and a surface roughness on a surface of the sheet support layer facing a second adhesive layer is denoted by RC, the surface roughnesses may satisfy a relationship of RB>RA>RC.

According to the above configuration, the surface roughness RB of the material sheet located at the middle in the decorative sheet is greater than the surface roughness RA of the front side on the thin film layer and the surface roughness RC of the surface of the sheet support layer of the second adhesive layer side, so that lateral stress applied to the entire sheet can be efficiently absorbed. Furthermore, in the relationship between the surface roughnesses RA and RC, the surface roughness RA of the thin film layer touched by a hand of the user is formed to be greater than RC, so that a user can feel a sense of touch derived from the material when touched by a hand of the user.

According to the decorative sheet of a third aspect, in the first aspect or the second aspect, the sheet support layer may comprise at least one selected from the group consisting of a polymer film containing polyethylene terephthalate, acryl, or polycarbonate as a main component and a nonwoven fabric.

According to the decorative sheet of a fourth aspect, in any one of the first aspect to the third aspect, the decorative sheet may further include a reinforcing layer comprising a resin and provided on a side of the sheet support layer opposite to the second adhesive layer.

According to the decorative sheet of a fifth aspect, in any one of the first aspect to the fourth aspect, an uneven shape different from the uneven shape on the front side of the material sheet in a case of being viewed from a normal direction may be disposed on a surface of the thin film layer opposite to the first adhesive layer.

According to the above configuration, it is possible to change an appearance such as a sense of gloss of the surface of the thin film layer touched by the user opposite to the first adhesive layer. In addition, it is possible to emphasize a sense of touch derived from the material sheet or perform expressions combining a different sense of touch.

According to the decorative sheet of a sixth aspect, in any one of the first aspect to the fifth aspect, the decorative sheet may further include a light source irradiating the decorative sheet with light from the back side toward the front side.

According to the decorative sheet of a seventh aspect, in any one of the first aspect to the sixth aspect, a printing layer including at least one or more concealing layers and one or more light diffusing layers, a base material for providing the printing layer, and a fourth adhesive layer bonding the base material to the sheet support layer may be provided in order between the second adhesive layer and the sheet support layer.

According to the decorative sheet of an eighth aspect, in any one of the first aspect to the seventh aspect, the decorative sheet may be at least one material sheet selected from the group consisting of stone, wood, cork, cloth, and leather.

A display device according to a ninth aspect may include the decorative sheet according to any one of the first aspect to the eighth aspect; and a contact operation control device provided on a surface of the sheet support layer opposite to the second adhesive layer in the decorative sheet and provided for a user to control an electronic device.

A display device according to a tenth aspect may include the decorative sheet according to any one of the first aspect to the eighth aspect; and a noncontact operation control device provided on a surface of the sheet support layer opposite to the second adhesive layer in the decorative sheet and provided to control an electronic device in accordance with a palm or arm motion of a user.

A display device according to an eleventh aspect may include the decorative sheet according to any one of the first aspect to the eighth aspect; and a contact operation control device and a noncontact operation control device provided on a surface of the sheet support layer opposite to the second adhesive layer in the decorative sheet and provided to control an electronic device, in which the contact operation control device and the noncontact operation control device can assign control of an operation in accordance with a use content of a user.

A method of manufacturing a decorative sheet according to a twelfth aspect includes:

a step of disposing a first adhesive layer and a thin film layer on a front side of a material sheet in which a relationship of Inequation R1>R2 representing that a surface roughness R1 on the front side is greater than a surface roughness R2 on a back side in order and disposing a second adhesive layer and a sheet support layer on the back side of the material sheet in order;

a step of sandwiching the thin film layer on the front side of the material sheet and the sheet support layer on the back side of the material sheet from a normal direction and applying heat with pressure; and a step of removing heat and pressure applied to the thin film layer, the first adhesive layer, the material sheet, the second adhesive layer, and the sheet support layer.

According to the above configuration, in the uneven shape on the front side of the material sheet, each uneven shape is deformed so that an interval thereof is widened during the thermocompression step. Thereby, the first adhesive layer penetrates into the deformed uneven shape. Furthermore, after the thermocompression step, when the deformed uneven shape returns to the original shape, the first adhesive layer in a melting state due to residual heat penetrates to be drawn into the deformed uneven shape. As a result, followability of the thin film layer formed thereon to the uneven shape on the front side of the material sheet is improved.

By forming the protective layer of a thin film to follow the uneven shape of the decorative material surface, it is possible to prevent a sense of depth in appearance and to maintain an original sense of touch of materials. As a result, it possible to provide surface protection without impairing the texture of decorative materials.

Furthermore, when a thermoplastic adhesive layer for bonding the thin film layer to the decorative material penetrates into the unevenness shape of the decorative material in the melting state, an air layer remains at an interface between the thermoplastic adhesive layer and the decorative material surface. As a result, the air layer serves as a buffer material that relaxes stress due to the difference in thermal expansion of each material. Therefore, defects such as crack generation due to the repeated expansion and contraction of the material and the protective layer of the thin film by aging can be reduced.

Hereinafter, a decorative sheet according to an exemplary embodiment, a method of manufacturing the decorative sheet, and a display device using the decorative sheet will be described with reference to the accompanying drawings. In the drawings, substantially the same members are denoted by the same reference numerals.

Exemplary Embodiment 1

Figure 1B:
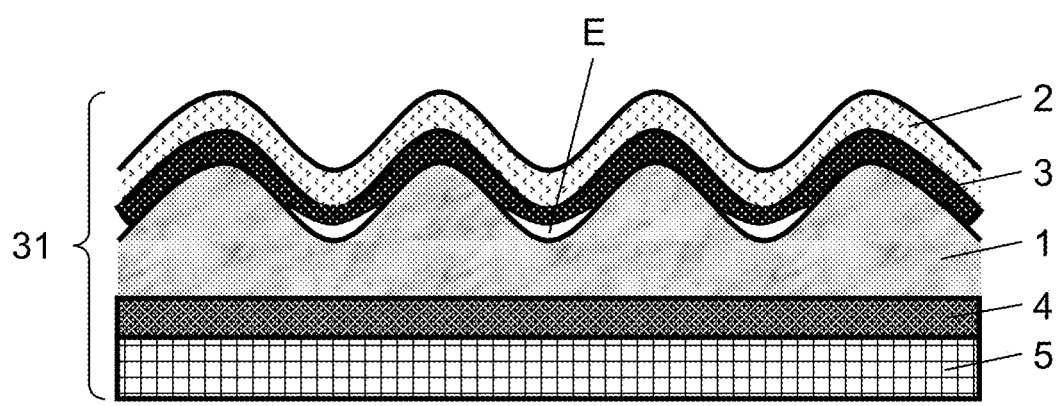
FIG. 1B is a cross-sectional view of the decorative sheet taken along line A-A in FIG. 1A.

FIG. 1A is a plan view of a decorative sheet using a stone sheet as a material sheet for decoration according to Exemplary embodiment 1. FIG. 1B is a cross-sectional view taken along line A-A in FIG. 1A.

Decorative sheet 31 is configured as decorative sheet 31 having stone sheet 1 as a component. Specifically, natural stone sheet 1 is used in decorative sheet 31 as a material sheet. First adhesive layer 3 is provided on a front side of stone sheet 1, and thin film layer 2 is provided on the outermost surface of decorative sheet 31 via first adhesive layer 3. In addition, second adhesive layer 4 is provided on a back side of stone sheet 1, and sheet support layer 5 is provided via second adhesive layer 4. In stone sheet 1 which is a material sheet, the relationship of Inequation R1>R2 representing that a surface roughness R1 of the front side is greater than a surface roughness R2 of the back side is satisfied. In addition, thin film layer 2 has a multilayer structure including at least one or more hard coat layers and one or more UV cut-off layers. Furthermore, each of the layers is integrated as one sheet, and air layer E exists on an interface between first adhesive layer 3 and a trough of an uneven shape on the surface of stone sheet 1.

According to the configuration of decorative sheet 31 of Exemplary embodiment 1, stone sheet 1 can be protected by thin film layer 2 provided on the front side of stone sheet 1, and texture derived from the material can be maintained. In addition, due to the air layer existing at the interface between first adhesive layer 3 and the trough of the uneven shape on the front side of stone sheet 1, air layer E serves as a buffer material. Therefore, it is possible to relax the stress in the decorative material and the thin film layer due to the difference in thermal expansion between different materials and reduce the crack generation and the like during changes with aging.

Hereinafter, members configuring the decorative sheet will be described.

Stone Sheet

Stone sheet 1 has a maximum thickness equal to or less than 5 mm and a minimum thickness equal to or greater than 0.1 mm. In a case where the thickness is greater than 5 mm, flexibility of stone sheet 1 is lost, so that processing such as bending is difficult. In a case where the thickness is less than 0.1 mm, manufacturing stone sheet 1 itself is difficult.

Stone sheet 1 has a feature in which light is transmitted through stone sheet 1 at least partially by transmitting light from a rear surface. The front side of stone sheet 1 has unevenness derived from the material, while the back side has a relatively smooth surface with a small uneven shape. Specifically, when a surface roughness Rz of the front side is denoted by R1 and a surface roughness Rz of the back side is denoted by R2, the relationships of R1>R2, $5\ \mu m < R1 < 20,000\ \mu m$, and $1\ \mu m < R2 < 200\ \mu m$ are satisfied. R2 refers to "maximum height roughness". Specifically, a value defined by Japanese Industrial Standards (JIS) and obtained by numerically converting the highest peak within a range of a reference length from a cross-sectional curve is expressed in micrometers. In a case where R1>R2 is not satisfied within the range, the difference in the uneven shape on the surface is increased, and the followability of thin film layer 2 to the surface of stone sheet 1 is decreased. As described above, by selecting the stone sheet having a greater surface roughness of the front side than the back side, a surface area is increased, and in an environment where the in-vehicle interior is exposed to the high temperature, there is an advantage that heat is easily radiated from the surface to the outside. On the other hand, the back side has the relatively smooth surface, so that the smooth surface of the back side serves to reduce the difference in expansion and contraction of the uneven shape on the front side when decorative sheet 31 repeats thermal expansion due to the temperature difference. As a result, it possible to reduce an effect on other layers formed on the back surface of decorative sheet 31 due to the difference in expansion and contraction.

Thin Film Layer

Thin film layer 2 has a multilayer structure including at least one or more hard coat layers and one or more UV cut-off layers. The thickness of each of the hard coat layer and the UV cut-off layer is in a range of 1 µm to 20 µm. Since a total thickness of thin film layer 2 is 3 µm to 50 µm and thin film layer 2 has transparency, a distance from stone sheet 1 is closer to each other, and the original texture of stone sheet 1 can be felt without feeling a sense of depth in a case of applying a general thick film top coat. In addition, additives such as a filler and a flame retardant can be contained in the hard coat layer and the UV cut-off layer. Furthermore, when thin film layer 2 is formed, an optional unevenness can be imparted to an outermost surface shape by using graining of a mold, a grained plate, a grained film, a filler, or the like, and it is also possible to freely change the appearance, the sense of touch, the degree of gloss, and the like of the surface of decorative sheet 31. In addition, due to thin film layer 2, in a case where a material such as stone sheet 1 that is hard and partially peels off the stone is insert-molded in a mold, decorative sheet 31 can be directly insert-molded without using an extra protective material for preventing dirt and scratches on the mold surface.

An uneven shape different from the uneven shape on the front side of stone sheet 1 which is a material sheet in a case of being viewed from a normal direction may be disposed on a surface of thin film layer 2 opposite to first adhesive layer 3. As a result, it is possible to change the appearance such as the sense of gloss of the surface of thin film layer 2 touched by a user opposite to first adhesive layer 3. In addition, it is possible to emphasize a sense of touch derived from the material or perform expressions combining a different sense of touch.

First Adhesive Layer and Second Adhesive Layer

First adhesive layer 3 and second adhesive layer 4 are made of a transparent olefin-based thermoplastic component or a polyolefin-based thermoplastic component. Although any film thickness thereof can be set, specifically, the thickness of first adhesive layer 3 is preferably 1 µm to 30 µm in order to enhance the followability of thin film layer 2 to the surface of stone sheet 1.

Sheet Support Layer

Sheet support layer 5 is made of a polymer film such as polyethylene terephthalate, acryl, or polycarbonate, or a nonwoven fabric. Therefore, even in a case where pressure is applied to and deforms the uneven shape on the surface of stone sheet 1 in the thermocompression step in the method of manufacturing a decorative sheet, since sheet support layer 5 buffers the deformation, the uneven shape is hardly damaged. A material, a thickness and the like of sheet support layer 5 can be selected according to a use.

Regarding Relationship of Surface Roughness

In a case where a surface roughness on a surface on thin film layer 2 opposite to first adhesive layer 3 is denoted by RA, a surface roughness on the front side of stone sheet 1 is denoted by RB and a surface roughness on a surface of sheet support layer 5 on a side of second adhesive layer 4 is denoted by RC, the surface roughnesses may satisfy a relationship of RB>RA>RC.

The surface roughness RB on the front side of stone sheet 1 located at the middle of decorative sheet 31 is greater than the surface roughness RA on the front side of thin film layer 2 and the surface roughness RC on a surface of sheet support layer 5 on a side of the second adhesive layer 4, so that lateral stress applied to the entire sheet can be efficiently absorbed. Furthermore, in the relationship between the surface roughness RA and the RC, the surface roughness RA of thin film layer 2 touched by a hand of the user is formed to be greater than RC, so that the user can feel a sense of touch derived from the material when touched by a hand.

Method of Manufacturing Decorative Sheet

Figure 1C:
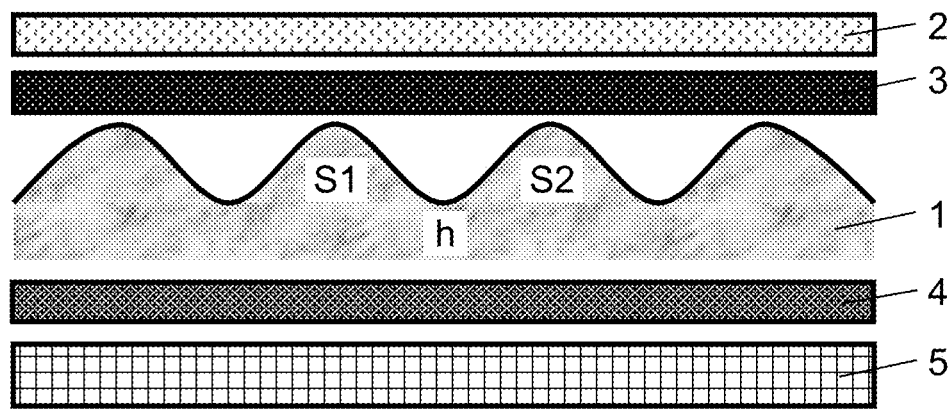
FIG. 1C is a cross-sectional view of the decorative sheet before a thermocompression step in a method of manufacturing the decorative sheet according to Exemplary embodiment 1.
Figure 1D:
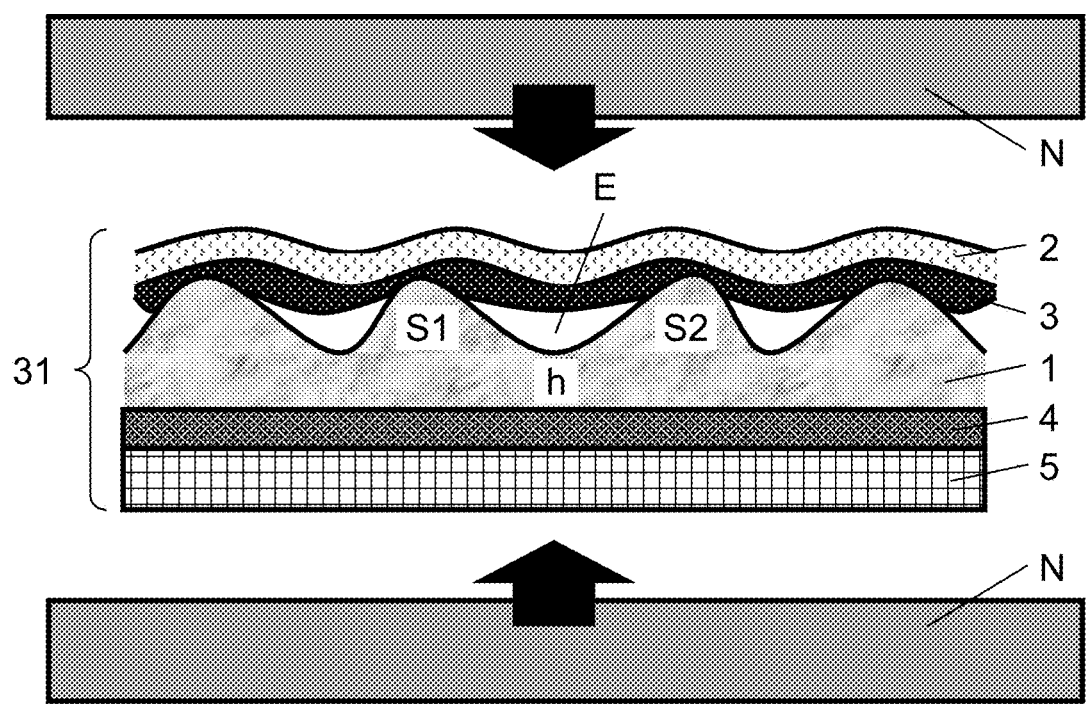
FIG. 1D is a cross-sectional view of the decorative sheet during the thermocompression step in the method of manufacturing the decorative sheet according to Exemplary embodiment 1.
Figure 1E:
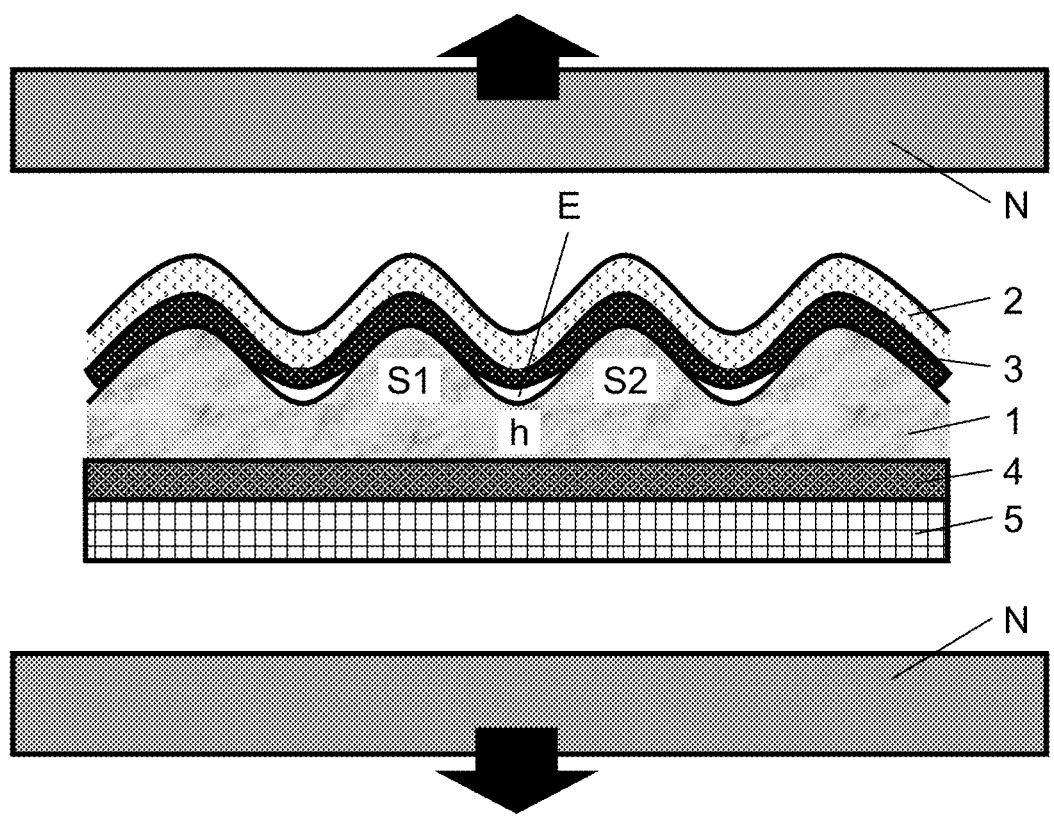
FIG. 1E is a cross-sectional view of the decorative sheet immediately after the thermocompression step in the method of manufacturing the decorative sheet according to Exemplary embodiment 1.

Each of FIGS. 1C, 1D, and 1E are cross-sectional views showing cross sections before, during, and immediately after a thermocompression step in the method of manufacturing decorative sheet 31 according to Exemplary embodiment 1.

(1) Stone sheet 1 is prepared as a material sheet, and first adhesive layer 3 and thin film layer 2 are disposed on the front side of stone sheet 1. In addition, second adhesive layer 4 and sheet support layer 5 are disposed on the back side of stone sheet 1. As shown in FIG. 1C, before the thermocompression step, first adhesive layer 3 and thin film layer 2 are not followed to the shape of the surface of stone sheet 1 and are only in a state where the respective layers are in contact with each other.

(2) In the thermocompression step of FIG. 1D, thin film layer 2 on the front side and sheet support layer 5 on the back side of stone sheet 1 are subjected to heat with pressure and sandwiched by thermocompression device N such as a vacuum heat laminator or a hot press from a normal direction. Thereby, an interval between protruding portion S1 and protruding portion S2 on the front side of stone sheet 1 is deformed in a direction in which the interval is widened by pressure of thermocompression device N. FIG. 1D shows a state where first adhesive layer 3 that is melted by heat penetrates into recessed portion h. At this time, air remains in recessed portion h due to the penetration of first adhesive layer 3, and air layer E is formed.

(3) Immediately after the thermocompression step in FIG. 1E, the pressure and the heat applied to stone sheet 1 by thermocompression device N are removed. As a result, the pressure applied to protruding portion S1 and protruding portion S2 on the front side of stone sheet 1 by thermocompression device N is removed. Therefore, when restored to an original shape of FIG. 1C, first adhesive layer 3 in the melting state due to residual heat during the thermocompression penetrates to be further squeezed into recessed portion h. Therefore, since thin film layer 2 formed on first adhesive layer 3 also penetrates to be drawn into recessed portion h, the followability of thin film layer 2 with respect to the uneven shape on the surface of stone sheet 1 is consequentially improved. In addition, air layer E remains as it is.

With the configurations, since the followability of thin film layer 2 to the surface of stone sheet 1 is improved and the unevenness of stone sheet 1 and the uneven shape of thin film layer 2 become similar to each other, it is possible to prevent a sense of depth in the appearance of decorative sheet 31 and maintain the original sense of touch derived from the material. As a result, it possible to provide decoration with surface protection and without impairing the texture of decorative materials. Furthermore, air layer E remaining in the trough bottom of the uneven shape of the decorative material serves as a buffer material that relaxes stress due to the difference in thermal expansion between different materials, and serves to reduce defects such as cracks generated from the repeated expansion and contraction of the decorative material and the thin film layer due to changes with aging. That is, in a case where thin film layer 2 has a greater thermal expansion than stone sheet 1 and decorative sheet 31 is exposed to the high temperature from the low temperature, thin film layer 2 expands and a distortion occurs on the surface of decorative sheet 31, but air layer E reduces the distortion.

Exemplary Embodiment 2

Figure 2A:
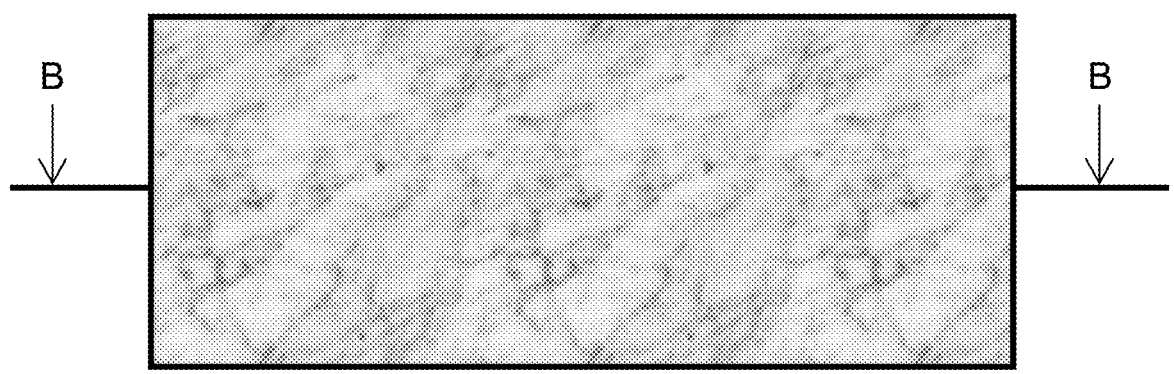
FIG. 2A is a plan view of a decorative sheet according to Exemplary embodiment 2.
Figure 2B:
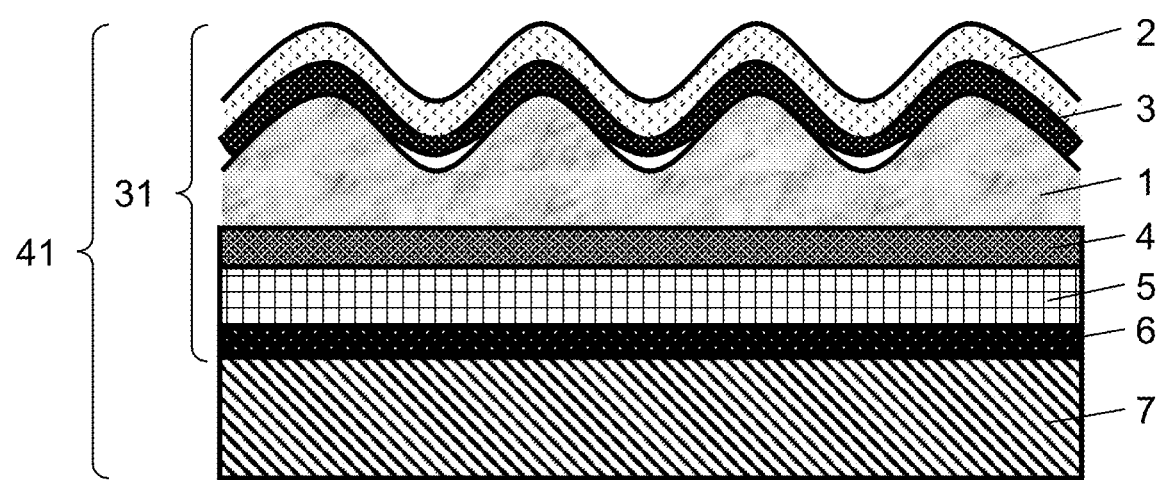
FIG. 2B is a cross-sectional view of a molded article including the decorative sheet taken along line B-B in FIG. 2A.

FIG. 2A shows decorative sheet 31 according to Exemplary embodiment 2, in which stone sheet 1 is used as a decorative material. FIG. 2B is a cross-sectional view of molded article 41 including decorative sheet 31 taken along line B-B in FIG. 2A.

In the drawings, components having the same actions as in Exemplary embodiment 1 are denoted by the same reference numerals. Exemplary embodiment 2 is configured as molded article 41 in which third adhesive layer 6 and reinforcing layer 7 are provided on the back side of sheet support layer 5 constituting decorative sheet 31 in addition to the configuration of Exemplary embodiment 1.

Decorative sheet 31 can be attached alone like a wallpaper as a single sheet and can also be integrated with reinforcing layer 7 by vacuum pressure forming, insert-molding, or the like.

Third adhesive layer 6 has a thickness of 1 μm to 50 μm and may be formed of a thermoplastic adhesive such as a coating type or a sheet shape, or a thermosetting adhesive.

Reinforcing layer 7 is shown in a state of being formed of a resin by the insert-molding, but may use a resin plate or a glass plate as long as a member has the same strength. An example of the resin that can be used as the resin material of reinforcing layer 7 includes general-purpose molding resins such as PMMA resin, ABS resin, PS resin, and PC resin. In addition, resins that are required to be molded at the high temperature such as a resin for an optical use and a super engineering resin are available.

FIG. 2B is a cross-sectional view in which third adhesive layer 6 is formed. However, in a case where insert-molding is performed on sheet support layer 5 using the nonwoven fabric, the molding resin enters a gap with the nonwoven fabric and thus an anchor effect is generated. As a result, decorative sheet 31 can be directly used as a member for insert-molding without forming third adhesive layer 6.

Exemplary Embodiment 3

Figure 3A:
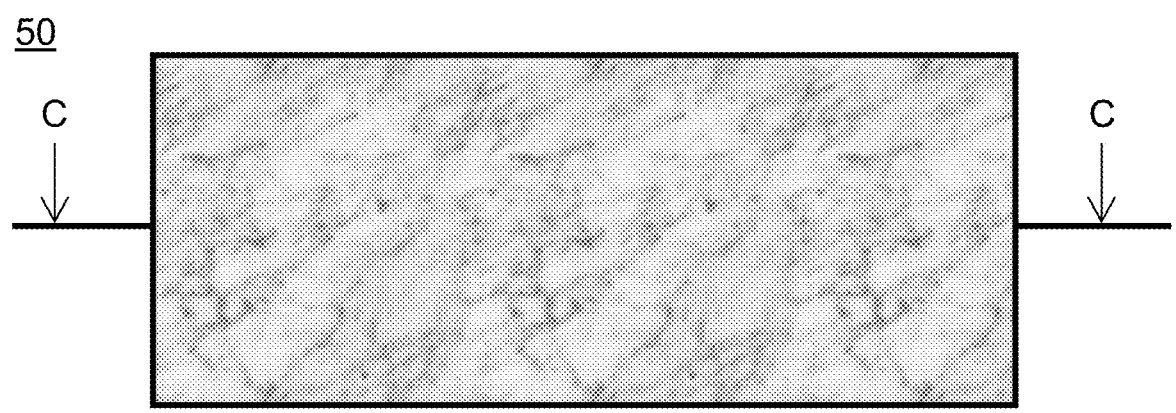
FIG. 3A is a plan view of a decorative sheet with a light source according to Exemplary embodiment 3.
Figure 3B:
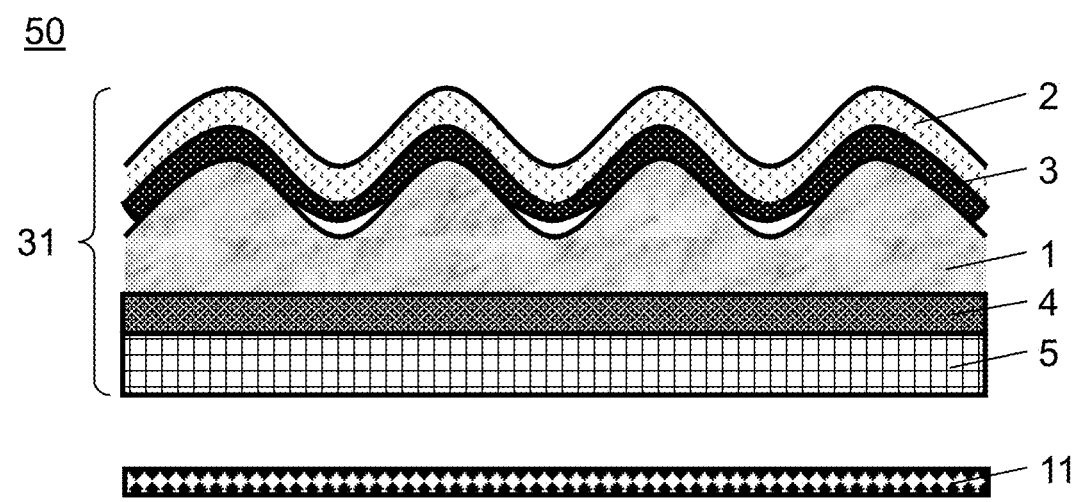
FIG. 3B is a cross-sectional view of the decorative sheet with a light source taken along line C-C in FIG. 3A.

FIG. 3A is a plan view of decorative sheet 50 with a light source according to Exemplary embodiment 3, in which a stone sheet is used as a decorative material. FIG. 3B is a cross-sectional view of decorative sheet 50 with the light source taken along line C-C in FIG. 3A. In the drawings, components having the same actions as in Exemplary embodiments 1 and 2 are denoted by the same reference numerals. Exemplary embodiment 3 is configured that light source 11 is provided on the back side of stone sheet 1 in addition to the configurations of Exemplary embodiments 1 and 2.

In FIGS. 3A and 3B, light source 11 is provided on the rear surface of decorative sheet 31. In decorative sheet 50 with the light source, the light emitted from light source 11 is transmitted through sheet support layer 5, second adhesive layer 4, stone sheet 1, first adhesive layer 3, and thin film layer 2, respectively. As a result, variation in the thickness of stone sheet 1 causes a difference in light transmittance, and an observer can visually recognize a lighting design of decorative sheet 31 in which a shade is expressed. The same configuration as described above can be provided on the rear surface of molded article 41 of Exemplary embodiment 2. In a case of molded article 41, third adhesive layer 6 and reinforcing layer 7 have light transmittance, and in the same way, the light emitted from light source 11 is transmitted through reinforcing layer 7, third adhesive layer 6, sheet support layer 5, second adhesive layer 4, stone sheet 1, first adhesive layer 3, and thin film layer 2, respectively. Therefore, the lighting design of molded article 41 can be expressed.

According to the configurations, for example, in a case where the decorative sheet is used for an in-vehicle interior member, light source 11 is turned on, so that the decorative sheet can be used as an illumination in a vehicle interior space.

Figure 3C:
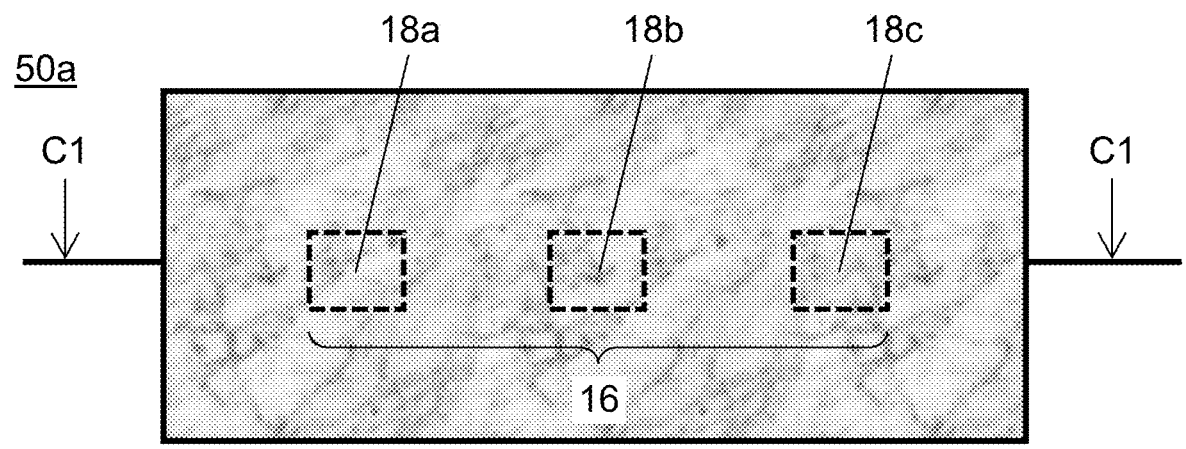
FIG. 3C is a plan view of a decorative sheet with a light source according to another example.
Figure 3D:
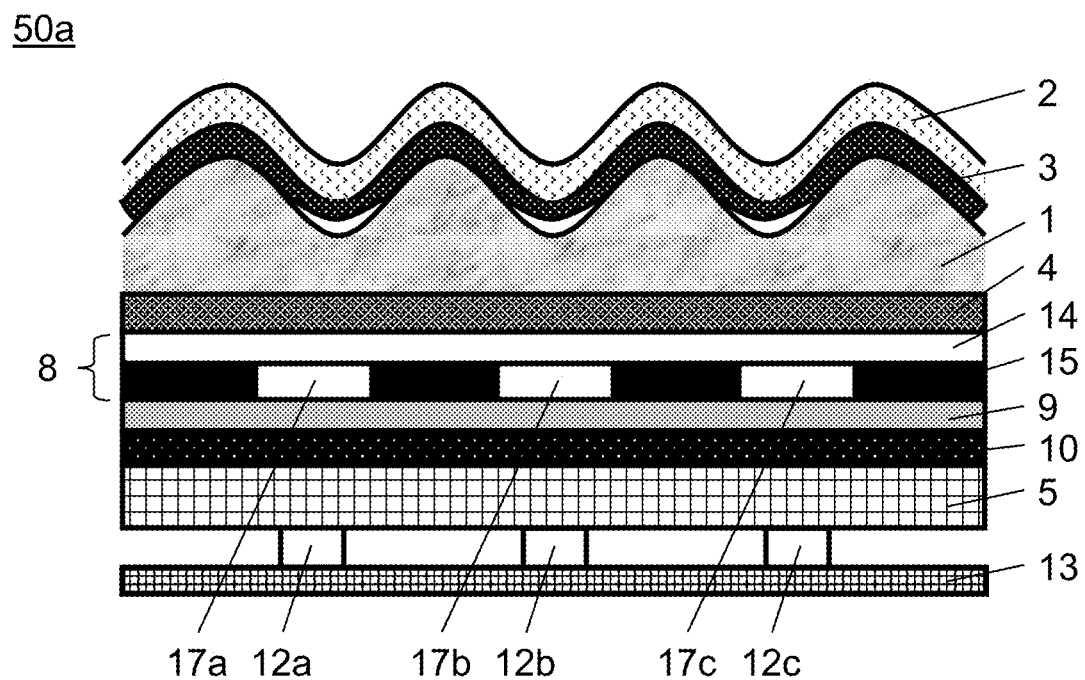
FIG. 3D is a cross-sectional view of the decorative sheet taken along line C1-C1 in FIG. 3C.

FIG. 3C is a plan view of decorative sheet 50a with a light source according to another example. FIG. 3D is a cross-sectional view of decorative sheet 50a with the light source taken along line C1-C1 in FIG. 3C.

In decorative sheet 50a with a light source according to the other example, printing layer 8, base material 9 for forming printing layer 8, and fourth adhesive layer 10 for bonding base material 9 to sheet support layer 5 are formed in order between second adhesive layer 4 and sheet support layer 5. Furthermore, light sources 12a, 12b, 12c, and board 13 are provided on the back side of decorative sheet 31. As described above, the same configuration as described above can be provided on the back side of molded article 41.

Printing Layer

Printing layer 8 is formed by a configuration in which at least one or more light diffusing layers 14 and concealing layer 15 printed on the back side thereof.

Light Diffusing Layer

Light diffusing layer 14 has an effect of uniformly diffusing light emitted from light sources 12a, 12b, and 12c and transmitting light. As a result, even in a case where a light source performing a point light emitting such as an LED is used as light sources 12a, 12b, and 12c, transmitted light can be uniformly emitted and transmitted to the surface of the decorative sheet regardless of a near or far distance from the light source.

Concealing Layer

Concealing layer 15 includes light transmitting portions 17a, 17b, and 17c of shape 16 partially patterned by any character, mark, or pattern, and is formed by a light shielding material in which light is not transmitted except for light transmitting portions 17a, 17b, and 17c. Light is emitted from light sources 12a, 12b, and 12c and transmitted only through light transmitting portions 17a, 17b, and 17c, and shape 16 is displayed on the surface of decorative sheet 31. In a case where light source 12a is turned on, light is transmitted through sheet support layer 5, fourth adhesive layer 10, base material 9, light transmitting portion 17a of concealing layer 15, light diffusing layer 14, second adhesive layer 4, stone sheet 1, first adhesive layer 3, and thin film layer 2, respectively, and mark 18a indicating a display area is displayed on the surface of thin film layer 2. The shape of light transmitting portion 17a is displayed as the shape of mark 18a. In a case where light source 12b is turned on, light is transmitted through sheet support layer 5, fourth adhesive layer 10, base material 9, light transmitting portion 17b of concealing layer 15, light diffusing layer 14, second adhesive layer 4, stone sheet 1, first adhesive layer 3, and thin film layer 2, respectively, and mark 18*b* indicating a display area is displayed on the surface of thin film layer 2. The shape of light transmitting portion 17*b* is displayed as the shape of mark 18*b*. In a case where light source 12*c* is turned on, light is transmitted through sheet support layer 5, fourth adhesive layer 10, base material 9, light transmitting portion 17*c* of concealing layer 15, light diffusing layer 14, second adhesive layer 4, stone sheet 1, first adhesive layer 3, and thin film layer 2, respectively, and mark 18*c* indicating a display area is displayed on the surface of thin film layer 2. The shape of light transmitting portion 17*c* is displayed as the shape of mark 18*c*.

Shape

The user can set any design of shape 16, such as a shape, a size, the number of shapes, and a display position. Furthermore, a display is not limited to the marks, and it is possible to display a display format such as characters or seven-segment display, and to be optionally set by the user.

Base Material

Base material 9 is formed of a general polymer film such as a polyethylene terephthalate film, an acrylic film, and a polycarbonate film. A thickness can be set optionally as long as the thickness is equal to or less than 200 μm, but is preferably equal to or less than 100 μm in consideration of warping of decorative sheet 31.

Fourth Adhesive Layer

Fourth adhesive layer 10 is formed of thermoplastic components such as a transparent olefin-based thermoplastic component or a polyolefin-based thermoplastic component similar to first adhesive layer 3 and second adhesive layer 4, and a film thickness can be optionally set.

Light Source

Light sources 12*a*, 12*b*, and 12*c* can be easily controlled in terms of color changes and can express full color by using light emitting diode chips of blue, red, and green (three primary colors of light) which are built-in as a single package. In addition, other light sources except for the LEDs can be used as a backlight. In a case of molded article 41, light sources 12*a*, 12*b*, 12*c*, and board 13 can be embedded between reinforcing layer 7 and third adhesive layer 6 or inside reinforcing layer 7, and the user can freely design in response to a condition to be used. Furthermore, by providing a half-mirror film or the like instead of the polymer film or the nonwoven fabric in sheet support layer 5, it is also possible to adjust the transmittance of light emitted from the light source.

With the configurations, it is possible to provide a decorative sheet or a molded article, which is more excellent in design, to the user by combining the texture of the decorative material and the lighting design described above.

Exemplary Embodiment 4

Figure 4A:
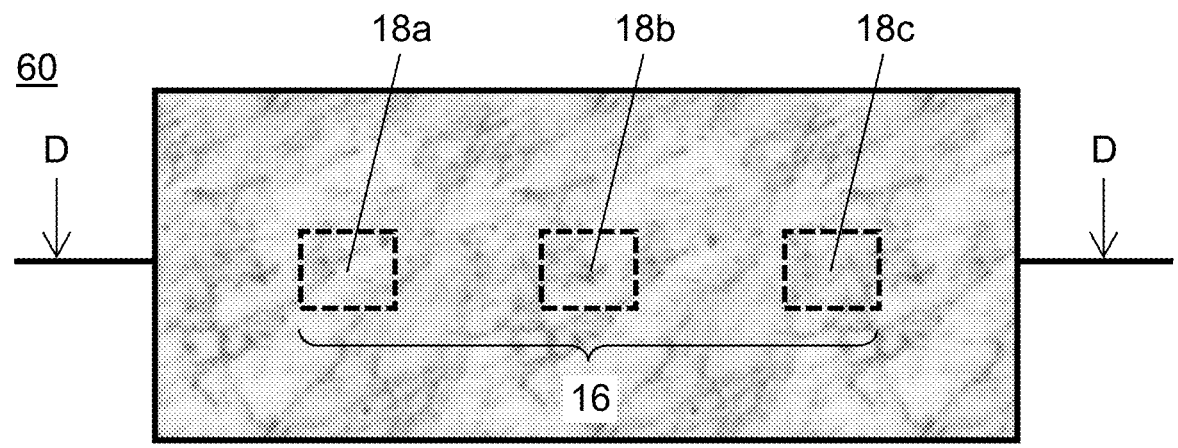
FIG. 4A is a plan view of a display device according to Exemplary embodiment 4.
Figure 4B:
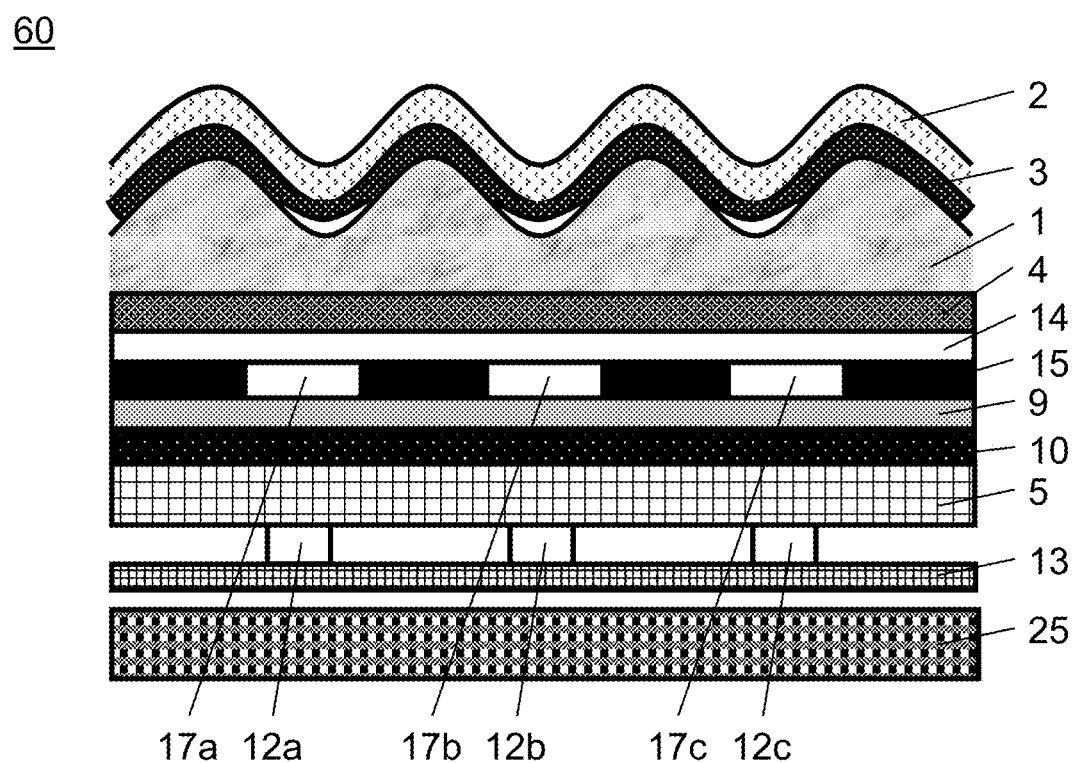
FIG. 4B is a cross-sectional view of the display device taken along line D-D in FIG. 4A.
Figure 4C:
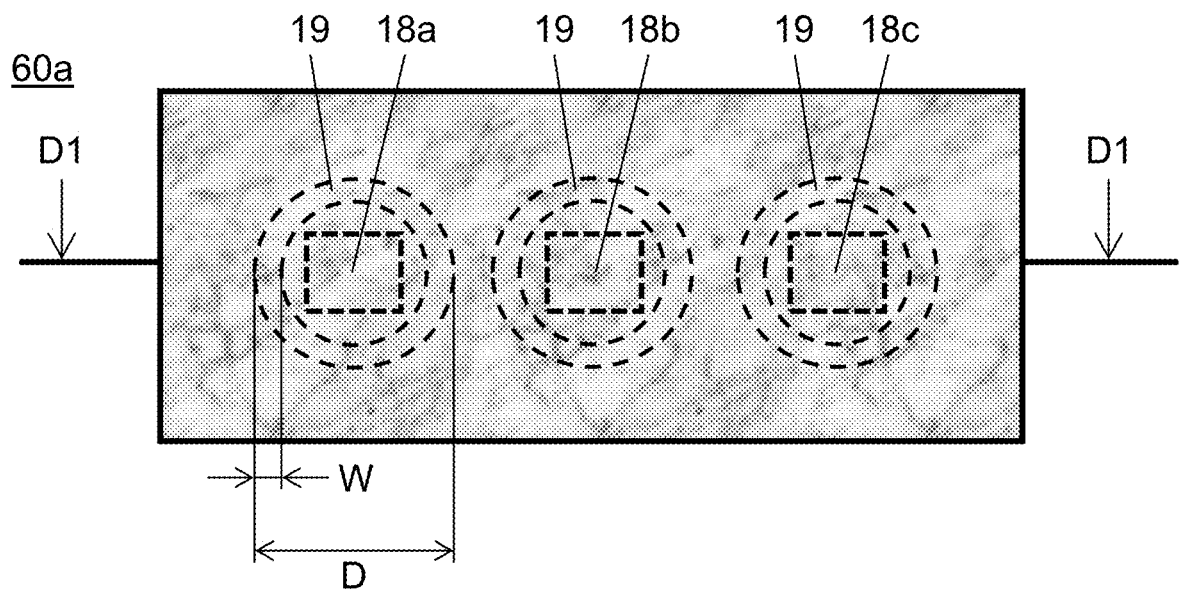
FIG. 4C is a plan view of a display device according to another example.
Figure 4D:
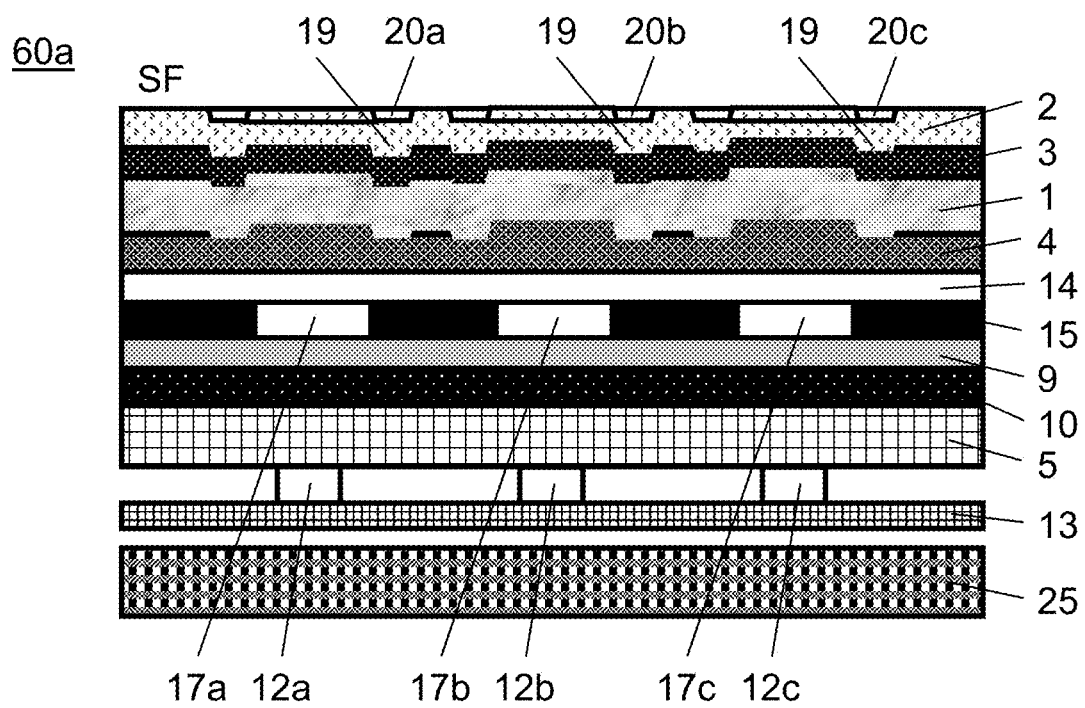
FIG. 4D is a cross-sectional view of the display device taken along line D1-D1 in FIG. 4C.
Figure 5:
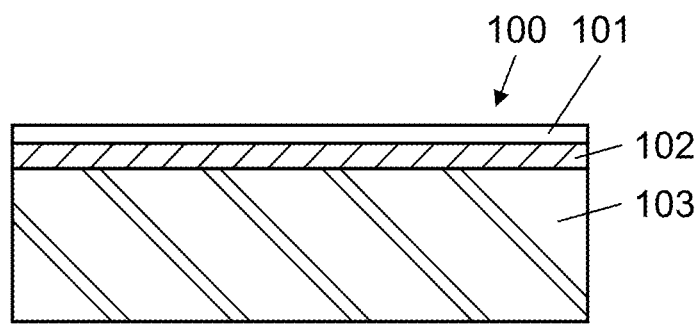
FIG. 5 is a cross-sectional view of a woody decorative molded article disclosed in Japanese Patent Unexamined Publication No. 2001-341106.

FIG. 4A is a plan view of display device 60 using the stone sheet as the decorative material according to Exemplary embodiment 4. FIG. 4B is a cross-sectional view of display device 60 taken along line D-D in FIG. 4A. FIG. 4C is a plan view of display device 60*a* according to another example. FIG. 4D is a cross-sectional view of display device 60*a* taken along line D1-D1 in FIG. 4C. In FIG. 4D, the description for uneven shapes of stone sheet 1, thin film layer 2, and first adhesive layer 3 is omitted. In the drawings, components having the same actions as in Exemplary embodiments 1 to 3 are denoted by the same reference numerals.

Exemplary embodiment 4 is configured as a display device in which contact or noncontact operation control device 25 is provided on the back side of decorative sheet 31 in addition to the configurations of Exemplary embodiments 1 to 3. The same configuration as described above can be provided on the rear surface of molded article 41.

With the configurations, an electronic device can be controlled by detecting an input operation based on a movement of a finger slid on an operation panel of the display device, a movement of a gesture of the user, or the like. For example, it is possible to control an up and down setting with respect to the brightness or volume of an information display device, the output volume of an audio device, the temperature of an air conditioner, and the like. In addition, a user interface with more excellent design can be provided by combining the display using the lighting design described in Exemplary embodiment 3 with operation control device 25.

In a case of using noncontact operation control device 25 of FIGS. 4A and 4B, a palm and arm motion of a user is read by a capacitive sensor or a distance image sensor, and as a result, an operation can be controlled.

On the other hand, in a case where a contact operation control device such as a capacitance type is used in operation control device 25 of FIGS. 4C and 4D, annular recessed groove 19 is formed around marks 18*a*, 18*b*, and 18*c*. Recessed groove 19 is formed such that thin film layer 2 formed on the front side of stone sheet 1 is shaped to be annular recessed portions 20*a*, 20*b*, and 20*c* from an upper side by using a press or the like. Properties of thin film layer 2 and stone sheet 1 are the same as in Exemplary embodiment 1. In a case where the user touches an operation input portion displayed on the front side of thin film layer 2 with a finger, at least an electrode pattern according to the operation input portion, which can detect coordinates of the user's finger while approaching, is required to be formed. Furthermore, regarding recessed groove 19, depth of recessed groove 19 from the outermost surface SF of decorative sheet 31 is 1 mm to 20 mm, width W of recessed groove 19 is suitably 3 mm to 30 mm, and the user can design freely within this range. In Exemplary embodiment 4, diameter D of recessed groove 19 was 40 mm, width W of recessed groove 19 was 8 mm, and the depth of recessed groove 19 was 2 mm.

In addition, in this Exemplary embodiment, although recessed groove 19 is provided in an annular shape, not only a rotational operation input but also a sliding linear operation can be performed by using the recessed groove having an arc shape or a straight line shape of any length. Specifically, as described above, the depth from the outermost surface of the display device is 1 mm to 20 mm, and the width of the recessed groove is 3 mm to 30 mm.

By providing recessed groove 19 in this manner, operability in order to move a user's finger to a place where the user wants to slide the finger in a touching state can be improved. A contact detection input device is not limited as long as touch of the finger on a touch panel can be detected, such as a capacitance type or a pressure-sensitive input device.

In Exemplary embodiments 1 to 4, the stone sheet is used as the decorative material sheet, but the stone sheet is not limited as long as a material satisfies the relationship of Inequation R1>R2 with respect to the surface roughness R1 of the front side and the surface roughness R2 of the back side of the stone sheet described above. That is, instead of the stone sheet, any material such as wood, cork, cloth, and leather can be used as the material sheet.

The disclosure includes combinations of any Exemplary embodiment and/or Example of the above described Exemplary embodiments and/or Examples, and each Exemplary embodiment and/or example has an effect.

According to the configuration of the decorative sheet of the disclosure, the material sheet can be protected by the thin film layer provided on the front side of the material sheet, and texture derived from the material can be maintained. In addition, the air layer serves as the buffer material due to the air layer existing at the interface between the first adhesive layer and the trough of the uneven shape on the front side of the material sheet, the stress in the decorative material and the thin film layer due to the difference in thermal expansion between different materials can be relaxed, and the crack generation and the like during changes with aging can be reduced.

In addition, according to the method of manufacturing a decorative sheet of the disclosure, the thin film layer having a multilayer structure is formed so as to follow the uneven shape on the surface of the material sheet by using the thermocompression step. As a result, it possible to provide the surface protective layer to be thin without impairing the appearance and the sense of touch of the decorative material as the material sheet. Therefore, original texture of the decorative material can be dramatically enhanced as compared with a top coating protective layer having an emphasized plastic-like appearance and a strong sense of gloss and depth.

The decorative sheet according to the disclosure contributes to high functionality and high design in fields where there are needs for decoration such as various home electric appliance exteriors and in-vehicle interior.

What is claimed is:

1. A decorative sheet comprising:
a material sheet including a front side and a back side opposite to the front side, the front side having a first surface roughness greater than a second surface roughness of the back side;
a first adhesive layer provided on the front side of the material sheet;
a thin film layer provided above the front side of the material sheet via the first adhesive layer;
a second adhesive layer provided on the back side of the material sheet; and
a sheet support layer provided below the back side of the material sheet via the second adhesive layer,
wherein the thin film layer has a multilayer structure including at least one or more hard coat layers and one or more ultraviolet (UV) cut-off layers, and
the material sheet, the first adhesive layer, the thin film layer, the second adhesive layer, and the sheet support layer are integrated as one sheet, and an air layer exists on an interface between the first adhesive layer and a trough of an uneven shape on the front side of the material sheet.

2. The decorative sheet of claim 1,
wherein in a case where a surface roughness on a surface of the thin film layer opposite to the first adhesive layer is denoted by RA, a surface roughness on the front side of the material sheet is denoted by RB, and a surface roughness on a surface of the sheet support layer facing the second adhesive layer is denoted by RC, the surface roughnesses satisfy a relationship of RB>RA>RC.

3. The decorative sheet of claim 1,
wherein the sheet support layer comprises at least one selected from the group consisting of a polymer film containing polyethylene terephthalate, acryl, or polycarbonate as a main component and a nonwoven fabric.

4. The decorative sheet of claim 1, further comprising:
a reinforcing layer comprising a resin and provided on a side of the sheet support layer opposite to the second adhesive layer.

5. The decorative sheet of claim 1,
wherein an uneven shape different from the uneven shape on the front side of the material sheet in a case of being viewed from a normal direction is disposed on a surface of the thin film layer opposite to the first adhesive layer.

6. The decorative sheet of claim 1, further comprising:
a light source irradiating the decorative sheet with light from the back side toward the front side.

7. The decorative sheet of claim 1,
wherein a printing layer including at least one or more concealing layers and one or more light diffusing layers, a base material for providing the printing layer, and a fourth adhesive layer bonding the base material to the sheet support layer are provided in order between the second adhesive layer and the sheet support layer.

8. The decorative sheet of claim 1,
wherein the material sheet is at least one material sheet selected from the group consisting of stone, wood, cork, cloth, and leather.

* * * * *